July 21, 1925.  1,546,402
A. G. J. RAPP
ADJUSTABLE MEASURING CHUTE
Filed May 26, 1924  2 Sheets-Sheet 1
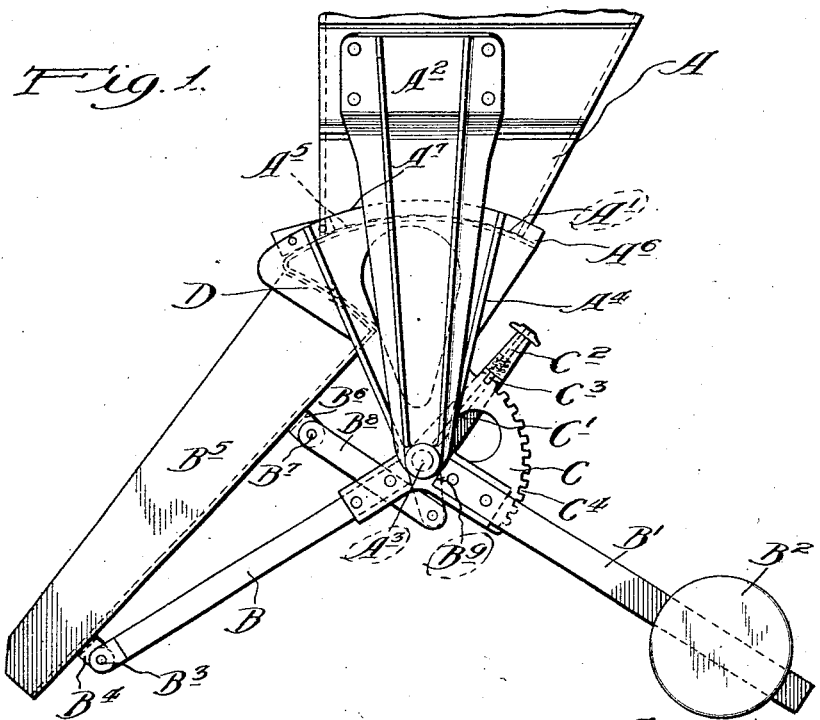
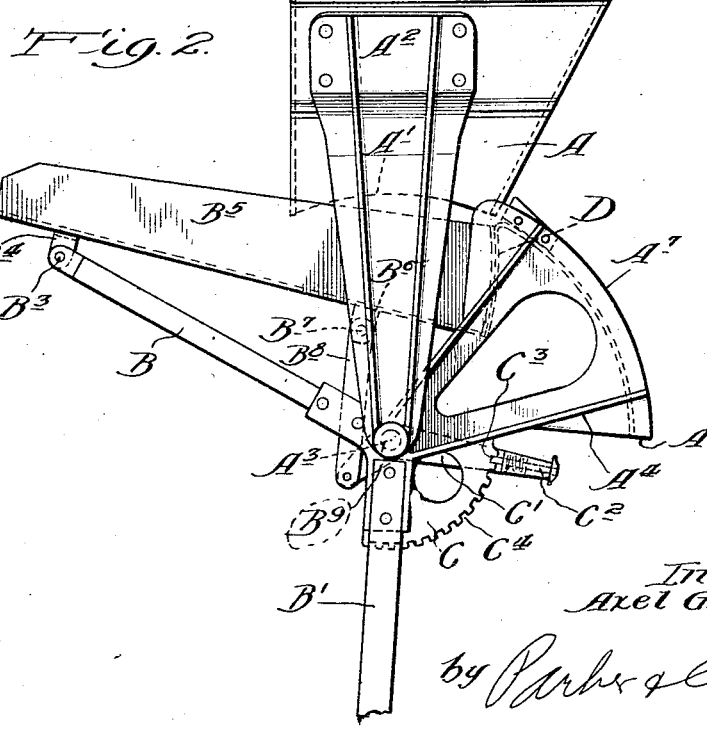
Inventor:
Axel G. J. Rapp,
by Parker & Carter
Attys

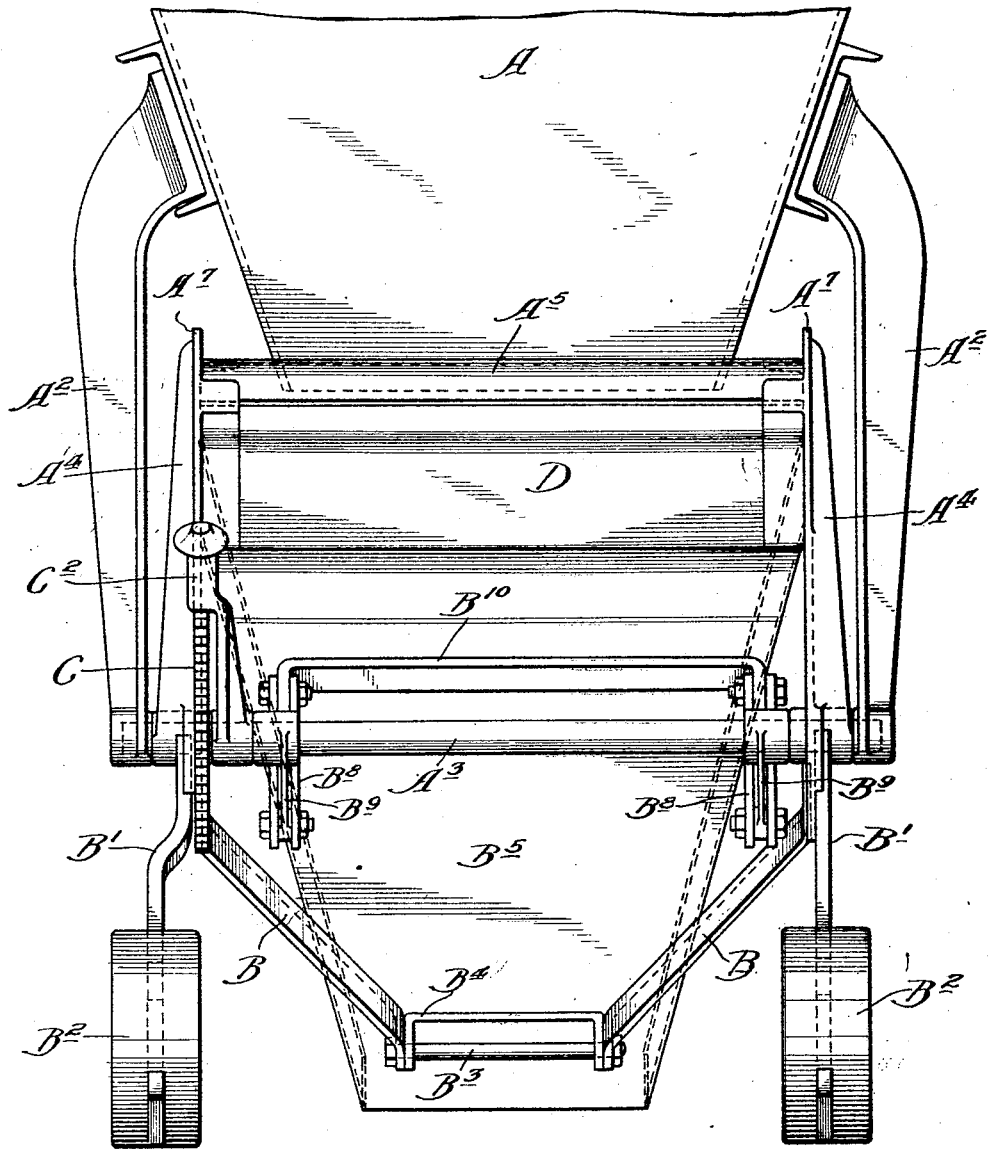

Patented July 21, 1925.

1,546,402

UNITED STATES PATENT OFFICE.

AXEL G. J. RAPP, OF CHICAGO, ILLINOIS, ASSIGNOR TO LINK-BELT COMPANY, OF CHICAGO, ILLINOIS, A CORPORATION OF ILLINOIS.

ADJUSTABLE MEASURING CHUTE.

Application filed May 26, 1924. Serial No. 716,080.

*To all whom it may concern:*

Be it known that I, AXEL G. J. RAPP, a citizen of the United States, residing at Chicago, in the county of Cook and State of Illinois, have invented a certain new and useful Improvement in Adjustable Measuring Chutes, of which the following is a specification.

My invention relates to improvements in adjustable measuring chutes adapted to measure or control the quantity of granular material fed from a hopper or other suitable supply source. One purpose of my invention is to provide a measuring chute which may be used for the purpose of filling the flask in a foundry and means are provided whereby the chute can be set so as to give a measured quantity of sand, the setting, of course, being necessary because different sized flasks or castings require different amounts of sand. The arrangement is such that every time the chute is operated, it will feed to the flask or other receptacle the preset or tested amount of material. Other objects will appear from time to time in the course of the specification and claims.

My invention is illustrated more or less diagrammatically in the accompanying drawings, wherein:

Figure 1 is a side elevation with gate closed;

Figure 2 is a similar view with gate open;

Figure 3 is a rear view.

Like parts are indicated by like characters throughout the specification and drawings.

A is a hopper or other suitable receptacle adapted to be kept filled with sand or other material by any suitable means. This hopper has an open discharge mouth $A^1$. Downwardly depending from both sides of the hopper are supporting brackets $A^2 A^2$ which brackets carry a shaft $A^3$ extending across the mouth of the hopper at a point considerably below it. Projecting upwardly from this shaft are gate supporting brackets $A^4 A^4$ which carry a curved under-cut gate $A^5$ adapted when in the position shown in full lines in Figure 1 to close the hopper mouth $A^1$. This under-cut gate terminates in a flange $A^6$ which limits the movement in a counter-clockwise direction and cooperates with flanges $A^7 A^7$ on either side of the gate to limit spilling of material between the bottom of the hopper and the gate.

Associated with brackets $A^4$ are downwardly and forwardly and rearwardly extending bars $B B^1$. The bars $B^1$ carry adjustable counterweights $B^2$, and are generally perpendicular to the shaft $A^3$. The bars $B$ are bent inwardly and carry a pivot bar $B^3$ upon which are pivoted brackets $B^4$ which support the lower end of a flanged chute $B^5$. The upper end of this flanged chute is supported by brackets $B^6$ on a pivot bar $B^7$, which bar is supported at its ends by links $B^8$. These links are pivoted to levers $B^9$ rotatable on the shaft $A^3$. These levers are tied together by a yoke $B^{10}$ and are each of them rotatably mounted on the shaft $A^3$.

C is a quadrant fixed on the shaft $A^3$; $C^1$ an adjusting lever rigidly attached to one of the levers $B^9$ provided with a handle $C^2$ having a spring held latch $C^3$ adapted to engage the notches $C^4$ in the quadrant C to lock the levers $B^9$ in adjustable angular relation with respect to the shaft $A^3$.

The chute $B^5$ is closed at its upper end by a curved plate D associated with the under-cut gate $A^5$. This plate is concentric with the pivot bar $B^3$ so that when the upper end of the chute is rotated, the chute will travel along the curved surface D without leaving space for escape of material, making it possible to change the depth of the chute below the under-cut gate $A^5$.

The hopper A may take the form of a spout or any other suitable material supplying or conducting means, it being sufficient that it be such a shape as will permit the sand to be banked up against the under-cut gate so as to be ready to be discharged when the gate is opened.

It will be evident that while I have shown in my drawings an operative device, still many changes might be made in the size, shape and disposition of parts without departing materially from the spirit of my invention. I wish, therefore, that my showing be taken in a sense as diagrammatic.

The use and operation of my invention are as follows:

Starting with the process shown in Figure 1, the operator who wants to get sand or measure out any other kind of material will rotate the under-cut gate in a clockwise direction. As the under-cut gate comes out of line with the discharge end of the hopper, the chute will rotate into line and material will run out from the hopper, fill the pocket at the top of the chute until the angle of repose is reached. Then the operator will operate the gate in the opposite direction bringing the gate into line with the hopper and closing it and allowing the material which has fallen into the chute to run down the chute and be discharged. Only the measured amount of material caught in the chute will get out because the under-cut gate will stop flow from the hopper to the chute.

The amount of material being held in the chute depends upon the depth of the chute and this can be set and locked by means of the handle and latch so that the operator may know that whenever he works the gate, it gives a predetermined measured amount of material. It is possible, thus to set up the machine once and for all and as long as the operator continues to work on the particular job he is doing, he gets the right amount of sand all the time. When he changes the job, he will have to change the adjustment of the chute and in a foundry for different jobs, a list can be made of the setting for each particular job and the operator will have access to the list and can set the gate at the proper point.

I claim:

1. The combination with a discharge spout of an under-cut gate and chute mounted for movement in unison, the chute being adapted to prevent out-flow of material when the gate is out of register with the spout, means for adjusting the chute with respect to the gate to control the amount of material fed out at each opening of the gate.

2. The combination with a discharge spout of an under-cut gate mounted for rotation into and out of register with the spout, a chute mounted for rotation with the gate and means for angularly adjusting the chute with respect to the gate independent of its movement therewith to control the amount of material fed to the chute when the gate is opened.

3. The combination with a discharge spout of an under-cut gate, a frame mounted for movement therewith, a chute pivoted thereon at a point remote from the gate and means for moving the end of the chute adjacent the gate toward and from the gate to adjust the amount of material fed to the chute when the gate is opened.

4. The combination with a discharge spout of a cylindrical under-cut gate, a frame mounted for rotation therewith, a chute mounted thereon at a point removed from the gate and means for moving the end of the chute adjacent the gate toward and from the gate in a generally radial direction to control the amount of material fed to the chute when the gate is opened.

5. The combination with a discharge spout of a cylindrical under-cut gate mounted for movement into and out of register therewith, a lip depending downwardly from the gate, a chute mounted for rotation with the gate and abutting said lip to form a pocket which is adapted to receive material from the spout when the gate is opened and to discharge material along the chute when the gate is closed, the chute being movable toward and from the gate along the lip to permit adjustment of the size of the pocket thus formed.

6. The combination with a discharge spout of a cylindrical under-cut gate mounted for movement into and out of register therewith, a lip depending downwardly from the gate, a chute mounted for rotation with the gate and abutting said lip to form a pocket which is adapted to receive material from the spout when the gate is opened and to discharge material along the chute when the gate is closed, the chute being movable toward and from the gate along the lip to permit adjustment of the size of the pocket thus formed, a framework associated with the gate upon which the chute is pivoted and a control lever associated therewith whereby the inner end of the chute may be moved along the lip.

7. The combination with a discharge spout of a cylindrical under-cut gate mounted for movement into and out of register therewith, a lip depending downwardly from the gate, a chute mounted for rotation with the gate and abutting said lip to form a pocket which is adapted to receive material from the spout when the gate is opened and to discharge material along the chute when the gate is closed, the chute being movable toward and from the gate along the lip to permit adjustment of the size of the pocket thus formed, a framework associated with the gate upon which the chute is pivoted and a control lever associated therewith whereby the inner end of the chute may be moved along the lip, a quadrant and latch whereby the control lever may be locked in adjusted position.

Signed at Chicago, county of Cook and State of Illinois, this 21st day of May 1924.

AXEL G. J. RAPP.